Sept. 4, 1956 G. H. KUHL 2,761,921
TONE CONTROL CIRCUIT
Filed May 20, 1952
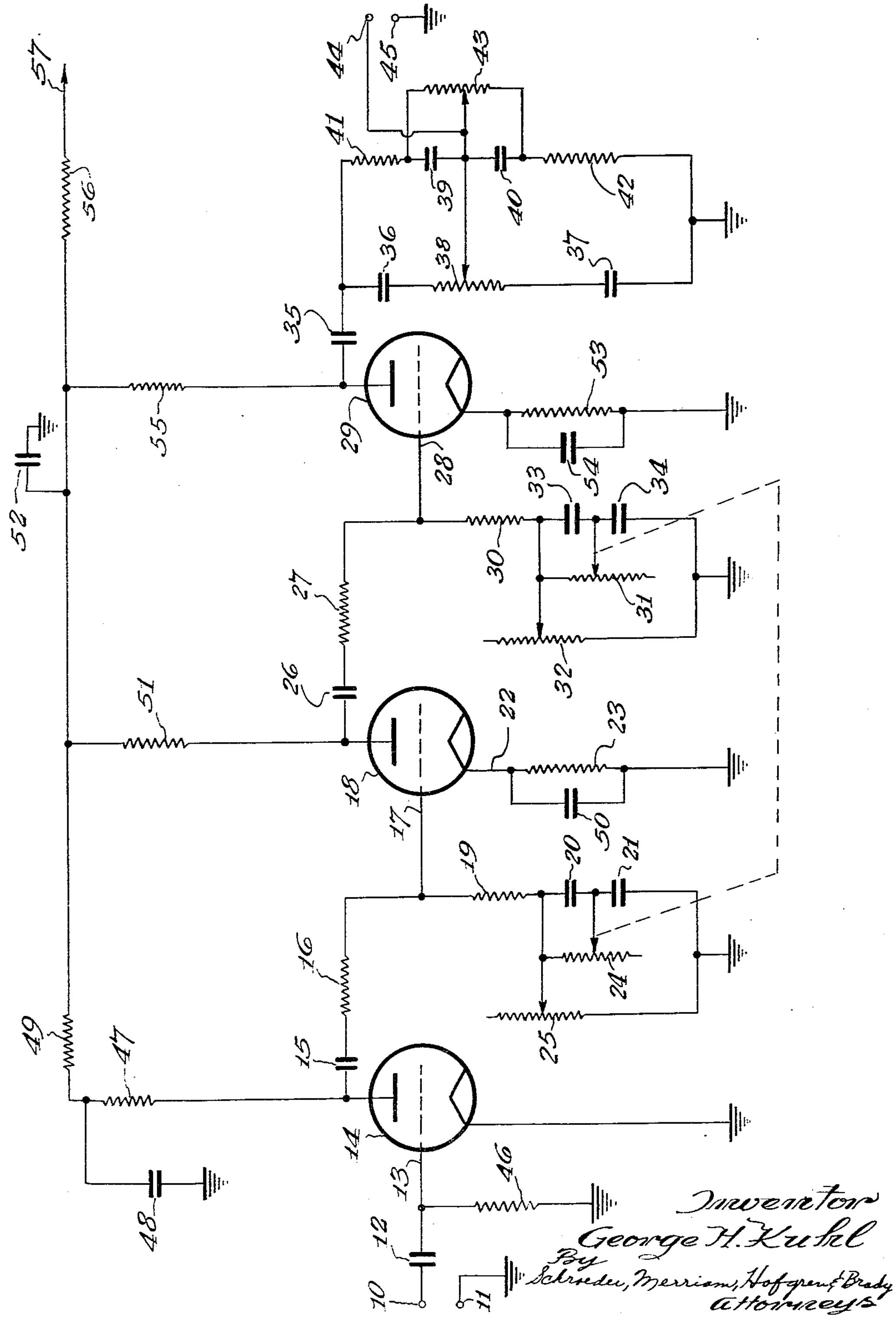
Inventor
George H. Kuhl
By Schroeder, Merriam, Hofgren & Brady
Attorneys United States Patent Office 2,761,921

Patented Sept. 4, 1956

2,761,921

TONE CONTROL CIRCUIT

George H. Kuhl, Glen Ellyn, Ill.

Application May 20, 1952, Serial No. 288,830

6 Claims. (Cl. 179—171)

This invention relates to audio frequency amplifiers, and more particularly to a manually adjustable circuit for modifying the frequency response of such an amplifier.

In designing a high fidelity audio amplifier particularly for use in the reproduction of recordings, a number of difficulties are encountered. The various manufacturers of recordings each use a different frequency-amplitude curve in cutting their recordings. The frequency-amplifier characteristic of different commercial recordings, particularly at the lower audio frequencies, may vary over a considerable range. Generally, the low frequencies, as the range from 20 cycles per second to 400 cycles per second are attenuated to a greater or lesser extent. Furthermore, most transducers or pickup units do not have a straight line frequency response characteristic. As a result, the input signal to the amplifier (the output signal of the transducer) will not be a true replica of the original recorded sound. This situation is particularly troublesome in connection with musical recordings where many of the frequencies present lie in the relatively low audio frequency range.

Many so-called "bass boost" circuits have been devised, but generally their frequency response characteristic is such that the very low audio frequencies (20 to 50 cycles per second) are overly accentuated or amplified to the point where they become objectionable. I have devised and am herein disclosing and claiming a manually adjustable circuit for modifying the frequency response of an amplifier which overcomes these difficulties.

One object of this invention is to provide a manually adjustable circuit for modifying the frequency response of an audio amplifier. Another object is to provide such a circuit which will accentuate particularly a band of frequencies including the low audio frequencies and the lower portion of the middle range of audio frequencies. A further object is to provide such a circuit which will not overly accentuate the very low audio frequencies. Yet another object is to provide such a circuit which includes a resistor in series with a reactive element and a variable resistor in parallel with the reactive element. Yet a further object is to provide a vacuum tube amplifier with a manually controlled circuit for modifying the frequency response characteristic as described and which includes a resistor between the input circuit and the grid of the vacuum tube, a reactive element between the grid and the cathode of the tube and a variable resistor in parallel with the reactive element. And another object is to provide an amplifier which incorporates such a manually controlled circuit with either a conventional bass boost circuit or a conventional treble boost circuit, or both. And a further object is to provide a two stage amplifier, comprising two vacuum tubes connected in cascade, each tube having a manually controlled circuit for modifying the frequency response characteristic as described connected between the grid and the cathode thereof.

Further objects and advantages will appear more fully from the specification and from the drawings, of which Fig. 1 is a schematic drawing of my invention.

A signal, as from the transducer (not shown) may be fed into the input terminals 10 and 11. This signal is coupled through a capacitor 12 to the grid 13 of the tube 14 which is shown here as a triode, but may be a tetrode or a pentode. This tube with its associated circuits amplifies the signal and serves to isolate the transducer from the rest of the system. I prefer to use this stage, but it could be eliminated and the input signal fed directly into the next tube.

The output of the tube 14 is coupled through the capacitor 15 and resistor 16 to the grid 17 of the tube 18 which is also shown as a triode, but might be a tetrode or a pentode. Also connected to the grid 17 are a second resistor 19, and a reactive element consisting of a first capacitor 20 and a second capacitor 21, all in series. The second capacitor 21 is effectively returned to the cathode 22 of the tube through ground and the cathode bias resistor 23. A variable resistor 24 is connected in parallel with the capacitor 20.

The circuit composed of resistors 16 and 19 and capacitor 20 and 21 forms a voltage divider, which has a definite frequency response characteristic and which is particularly adapted for improving the low frequency response of the amplifier without over-accentuating the very low frequencies. If the resistor 16 is 270,000 ohms and 19 is 27,000 ohms and the capacitor 20 is .01 microfarad and 21 is .03 microfarad, the circuit will accentuate a wide band of low audio frequencies; giving a relatively flat response from 20 cycles per second to 200 cycles per second, and then tapering off gradually until it levels off at about 1,000 cycles per second. The resistor 19 prevents the higher audio frequencies from being lost entirely.

The variable resistor 24 in parallel with the capacitor 20 provides a means for varying the effective capacity in the circuit and thus controlling the frequency response characteristic. With the circuit values given above a value of 100,000 ohms and has been found satisfactory to enable this resistor to have a full range of control. When the maximum value of this resistor is in the circuit, it has no effect but appears as an open circuit in comparison with the reactance of the capacitor 20 at these frequencies. As a result, the minimum effective capacity is in the circuit and a wide band of low audio frequencies is accentuated as already explained. As the portion of the resistor 24 in the circuit is reduced, the effective capacity in the circuit will increase and the higher portion of the band of low audio frequencies will be partially attenuated. When the resistor 24 is reduced to zero, the capacitor 20 will be short circuited, and a maximum capacity will be in the circuit. With these conditions only a relatively narrow band of very low frequencies as from 20 to 50 cycles per second will be equally accentuated; the response of the circuit will then fall off gradually until it levels off at about 1,000 cycles per second. At no time however are the very low audio frequencies overly accentuated so as to be objectionable.

The resistor 25 provides a direct current path from the grid 17 through ground back to the cathode 22, and should have a relatively high resistance, as 250,000 ohms. It may also be made variable to provide a further control over the frequency response of the amplifier.

The output of the tube 18 is coupled through the capacitor 26 and resistor 27 to the grid 28 of the tube 29 again shown as a triode, although a tetrode or a pentode would be satisfactory. The resistors 30, 31 and 32 and capacitors 33 and 34 cooperate with resistor 27 to form another manually variable circuit for controlling the frequency response, which operates in the same manner as the circuit previously discussed. (These circuit elements may have the same values as the corresponding elements in the previous circuit: resistor 27, 270,000 ohms; 30, 27,000 ohms; 31, 100,000 ohms; 32, 250,000 ohms; capacitor 33, .01 microfarad; 34, .03 microfarad.) By connecting two such circuits in cascade as shown, the effectiveness of this arrangement is greatly increased and a very satisfactory control over the total frequency response is provided. Resistors 24 and 31 may be ganged together so as to be operated by a single control if desired.

The output of the tube 29 is coupled through capacitor 35 to a conventional treble control composed of capacitors 36 and 37 and a variable resistor 38; and a conventional bass control composed of capacitors 39 and 40, resistors 41 and 42 and variable resistor 43. The output of the amplifier appears across terminals 44 and 45 and may be further amplified in a conventional audio amplifier (not shown) and then fed to a loudspeaker.

The combination of two stages of amplification each having a manually adjustable circuit for accentuating a band of relatively low audio frequencies with circuits providing conventional bass and treble boost provides a very versatile amplifier which may be adjusted to compensate for any distortion introduced by the manufacturer of the record or by the non-linear characteristic of the transducer.

Many of the circuit elements have not been given values. Although these should be apparent to one skilled in the art, in order that there will be no question as to the operativeness of the disclosure, all elements have been assigned a reference numeral and workable values therefor are listed below:

Tube 14, type 6F5, triode; 18, type 6J7, triode connected; and 29, type 6J7, triode connected.

Resistor 23, 5,600 ohms; 38, 3 megohms; 41, 300,000 ohms; 42, 30,000 ohms; 43, 3 megohms; 46, 500,000 ohms; 47, 100,000 ohms; 49, 18,000 ohms; 51, 100,000 ohms; 53, 2,700 ohms; 55, 50,000 ohms; and 56, 22,000 ohms.

Capacitor 12, .05 microfarad; 15, .05 microfarad; 26, .05 microfarad; 35, .05 microfarad; 36, .0005 microfarad; 37, .0025 microfarad; 39, .001 microfarad; 40, .01 microfarad; 48, 30 microfarads; 50, 25 microfarads; 52, 30 microfarads; and 54, 25 microfarads.

The plate supply voltage, 57, may be 300 volts.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In an audio frequency amplifier having an input circuit and a vacuum tube with at least three elements including a cathode, a grid and a plate, operatively connected to amplify a signal, a manually variable circuit for modifying the frequency response to the amplifier comprising: a first resistor connected between said input circuit and said grid; a second resistor connected to said grid; a first capacitor connected in series with said second resistor; a second capacitor connected in series with said first capacitor and returned to the cathode of said tube, connecting the series combination of said second resistor, first capacitor and second capacitor between said grid and cathode; a variable resistor connected in parallel with one of said capacitors; and a resistive return path for direct current from said grid to said cathode.

2. In an audio frequency amplifier having an input circuit and a vacuum tube having at least three elements, including an input element and operatively connected to amplify a signal, a manually variable circuit for modifying the frequency response of the amplifier comprising: a resistor connected between said input circuit and the input element of said vacuum tube; a reactive element connected between said one element and another element of said vacuum tube; a variable resistor connected in parallel with said reactive element; and a conventional bass boost circuit operatively connected with the output of said vacuum tube.

3. In an audio frequency amplifier having an input circuit, and a vacuum tube with at least three elements, including a cathode, a grid and a plate, operatively connected to amplify a signal, a manually variable circuit for modifying the frequency response of the amplifier, comprising: a first resistor connected between said input circuit and the grid of said tube; a second resistor connected to the grid of said tube; a first capacitor connected in series with said second resistor; a second capacitor connected in series with said first capacitor and returned to the cathode of said tube, connecting the series combination of said second resistor, first capacitor and second capacitor between said grid and cathode; a variable resistor connected in parallel with said first capacitors; a circuit including resistance means providing a path for direct current from said grid to said cathode; a conventional treble boost circuit operatively connected with the output of said tube; and a conventional bass boost circuit operatively connected with the output of said tube.

4. In an audio frequency amplifier having an input circuit, a first vacuum tube with at least three elements, including a cathode, a grid and a plate, and a second vacuum tube with at least three elements, including a cathode, a grid and a plate, operatively connected in cascade to amplify a signal, a manually variable circuit for modifying the frequency response of the amplifier, comprising: a first resistor connected between said input circuit and the grid of said first vacuum tube; a second resistor connected to the grid of said first vacuum tube; a first capacitor connected in series with said second resistor; a second capacitor connected in series with said first capacitor and returned to the cathode of said first vacuum tube, connecting the series combination of said second resistor, first capacitor and second capacitor between said grid and cathode; a variable resistor connected in parallel with one of said capacitors; means providing a high resistance return path for direct current from the grid to the cathode of said first vacuum tube; a first resistor connected between the output of said first vacuum tube and the grid of said second vacuum tube; a second resistor connected to the grid of said second vacuum tube; a first capacitor connected in series with said resistor; a second capacitor connected in series with said first capacitor and returned to the cathode of said second vacuum tube, connecting the series combination of said last mentioned second resistor, first capacitor and second capacitor between the grid and cathode of said second tube; a variable resistor connected in parallel with one of said last mentioned capacitors and varied as a function of said first mentioned variable resistor; and means providing a high resistance return path for direct current from the grid to the cathode of said second vacuum tube.

5. In an audio frequency amplifier having an input circuit and a vacuum tube with at least three elements including a cathode, a grid and a plate, operatively connected to amplify a signal, a manually variable circuit for modifying the frequency response to the amplifier, comprising: a first resistor connected between said input circuit and said grid; a second resistor connected to said grid; a first reactive element connected in series with said second resistor; a second reactive element connected in series with said first reactive element and returned to the cathode of said tube, connecting the series combination of said reactive element and second reactive element between said grid and cathode; a variable resistor connected in parallel with one of said reactive elements; and a high resistance path for direct current from said grid to said cathode.

6. In an audio frequency amplifier having an input circuit, a first vacuum tube with at least three elements, including a cathode, a grid and a plate, and a second vacuum tube with at least three elements, including a cathode, a grid and a plate, operatively connected in cascade to amplify a signal, a manually variable circuit for modifying the frequency response of the amplifier, comprising: a first resistor connected between said input circuit and the grid of said first vacuum tube; a second resistor connected to the grid of said first vacuum tube; a first capacitor connected in series with said second resistor; a second capacitor connected in series with said first capacitor and returned to the cathode of said first vacuum tube, connecting the series combination of said second resistor, first capacitor and second capacitor between said grid and cathode; a variable resistor connected in parallel with one of said capacitors; means providing a high resistance return path for direct current from the grid to the cathode of said first vacuum tube; a first resistor connected between the output of said first vacuum tube and the grid of said second vacuum tube; a second resistor connected to the grid of said second vacuum tube; a first capacitor connected in series with said resistor; a second capacitor connected in series with said first capacitor and returned to the cathode of said second vacuum tube, connecting the series combination of said second resistor, first capacitor and second capacitor between said grid and cathode; a variable resistor connected in parallel with one of said last mentioned capacitors and ganged with said first mentioned variable resistor; and means providing a high resistance return path for direct current from the grid to the cathode of said second vacuum tube.

References Cited in the file of this patent

UNITED STATES PATENTS

| | | |
|---|---|---|
| 2,182,328 | Weinberger | Dec. 5, 1939 |
| 2,217,178 | Masters | Oct. 8, 1940 |
| 2,256,057 | Roberts | Sept. 16, 1941 |
| 2,361,602 | Clark | Oct. 31, 1944 |
| 2,547,251 | Bonadio | Apr. 3, 1951 |
| 2,646,468 | Hanert | July 21, 1953 |

OTHER REFERENCES

Publication: Audio Engineering, vol. 35, issue 8, August 1951, pages 15, 47, by Brooks.

Review of Scientific Instruments, March 1948 issue, "Simple RC Equalizer Circuits," page 196.